(12) United States Patent
Dvorak

(10) Patent No.: US 6,501,488 B2
(45) Date of Patent: *Dec. 31, 2002

(54) SYSTEM AND METHOD FOR MANAGING A PLURALITY OF ASSOCIATED WINDOWS FOR AN APPLICATION

(75) Inventor: Joseph E. Dvorak, Vancouver, WA (US)

(73) Assignee: Intel Corporation, Santa Clara, CA (US)

(*) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/383,482

(22) Filed: Aug. 26, 1999

(65) Prior Publication Data

US 2002/0054137 A1 May 9, 2002

Related U.S. Application Data

(63) Continuation of application No. 09/223,443, filed on Dec. 30, 1998.

(51) Int. Cl.[7] .................................................. G06F 3/00
(52) U.S. Cl. ...................................................... 345/804
(58) Field of Search ................................. 345/326, 339, 345/340, 343, 346, 352, 145, 156, 700, 764, 781, 802–805, 810, 788, 798–801; 709/313, 315, 318, 328, 329

(56) References Cited

U.S. PATENT DOCUMENTS

| | | | | |
|---|---|---|---|---|
| 5,204,947 A | * | 4/1993 | Bernstein et al. | 345/357 |
| 5,388,202 A | * | 2/1995 | Squires et al. | 345/334 |
| 5,432,940 A | * | 7/1995 | Potts et al. | 709/320 |
| 5,455,904 A | * | 10/1995 | Bouchet et al. | 345/346 |
| 5,659,694 A | * | 8/1997 | Bibayan | 345/788 |
| 5,801,696 A | * | 9/1998 | Roberts | 345/340 |
| 5,848,272 A | * | 12/1998 | Breggin et al. | 703/17 |
| 6,008,809 A | * | 12/1999 | Brooks | 345/792 |
| 6,108,714 A | * | 8/2000 | Kumagai et al. | 709/310 |

* cited by examiner

Primary Examiner—Crescelle N dela Torre
(74) Attorney, Agent, or Firm—Schwegman, Lundberg, Woessner & Kluth, P.A.

(57) ABSTRACT

Systems and methods for managing a plurality of windows associated with an application are disclosed. In one embodiment of the invention, the method includes displaying a plurality of windows, such as a first window processed by a first window handler and a second window processed by a second window handler. The method receives messages from an operating system, where the messages have message types. The method then passes the message to at least one of the windows, according to the message type.

24 Claims, 7 Drawing Sheets

SYSTEM AND METHOD FOR MANAGING A PLURALITY OF ASSOCIATED WINDOWS FOR AN APPLICATION

This application is a Continuation of application Ser. No. 09/223,443, filed Dec. 30, 1998, now abandoned.

FIELD OF THE INVENTION

The present invention relates generally to the field of electronic data processing systems, and more particularly, to windowing user interfaces.

BACKGROUND OF THE INVENTION

Modem computer systems typically provide a windows based user interface. Examples of such systems include MacOS™ from Apple Computer Systems, Solaris ™ from Sun Microsystems, and variants of the Microsoft Windows™ operating system, such as Windows 95™, Windows 98™, and Windows NT™, all available from Microsoft Corporation. These windowing systems typically provide applications the ability to create windows to display output data and to respond to input data when the window is active or when a cursor is positioned over the window. The output data is displayed when the application paints images, draws figures, or writes text to the window. Applications using windows can direct output to the windows under their control rather than directly to the display screen itself. This prevents output data from one application from interfering with the output data of another application.

In the past, the shape of a window has been limited to a rectangular window. However, recently windowing systems have added the capability for windows to be non-rectangular. That is, windows can now be in the shape of an ellipse, a circle, or a polygon with an arbitrary number of sides. One manner in which non-rectangular windows are created is by defining a non-rectangular region on the display, and then setting the region to be a window. For example, in the Microsoft Windows system, an elliptical, polygon, rectangular or round region is created using the CreateEllipticalRgn, CreatePolygonRgn, CreateRectRgn or CreateRoundRgn functions. The region is then set to a window using the SetWindowRgn function.

While the ability to create non-rectangular windows is an improvement, there are some restrictions accompanying the use of non-rectangular windows. One such restriction is that the title bar associated with such a window is left-justified. That is, the title bar appears beginning at the leftmost side of the non-rectangular region defining the window. No option is provided that allows the title bar to be centered or right justified.

Previous systems have attempted to solve this problem by taking over control of painting the title bar. That is, the system provides custom title bar painting code rather than letting the windowing system paint the title bar.

This approach, while providing for options in positioning the title bar, presents two significant problems. First, if the general appearance of title bars changes, as is common when new versions of windowing systems are released, the custom code provided in previous systems must be changed in order for the title bar to reflect the new appearance. This increases the maintenance cost associated with previous systems.

Second, the custom painting code typically does not address associated menu display operations. Thus, the main menu for the application that is invoked from the title bar will still be left justified, leading to situation that is potentially confusing to the application user.

For the reasons stated above, and for other reasons stated below which will become apparent to those skilled in the art upon reading and understanding the present specification, there is a need in the art for a way to provide a title bar for non-rectangular windows that provides for placement options other than left-justification.

SUMMARY

In one embodiment of the invention, a method includes displaying a plurality of windows, such as a first window and a second window. The method receives messages from an operating system, where the messages have message types. The method then passes the message to at least one of the windows, according to the message type.

DETAILED DESCRIPTION

In the following detailed description of exemplary embodiments of the invention, reference is made to the accompanying drawings which form a part hereof, and in which is shown by way of illustration specific exemplary embodiments in which the invention may be practiced. These embodiments are described in sufficient detail to enable those skilled in the art to practice the invention, and it is to be understood that other embodiments may be utilized and that logical, mechanical, electrical and other changes may be made without departing from the spirit or scope of the present invention. The following detailed description is, therefore, not to be taken in a limiting sense, and the scope of the present invention is defined only by the appended claims.

The detailed description begins with a description of a hardware environment in which embodiments of the inventions may be practiced. This is followed by a description of a software environment in which embodiments of the invention may be practiced. Finally, methods of various embodiments of the invention are described.

In the detailed description that follows, reference is made to sending messages to windows. Those of skill in the art will appreciate that differing window systems provide different mechanisms for the windows created within their respective systems to send and process messages. For example, messages can be placed on identifiable message queues associated with a window. Alternatively, each window may have its own window handling procedure. Messages can be sent to a window by having the windowing system call a function or functions defined for the particular window and passing the message as a parameter to the function call. As those skilled in the art will appreciate, those functions can be defined in software or in firmware. For the purposes of this application, sending a message to a window comprises any of the above described mechanisms and others mechanisms in which the particular windows operating system notifies software controlling a window that it must process a message.

Figure 1:
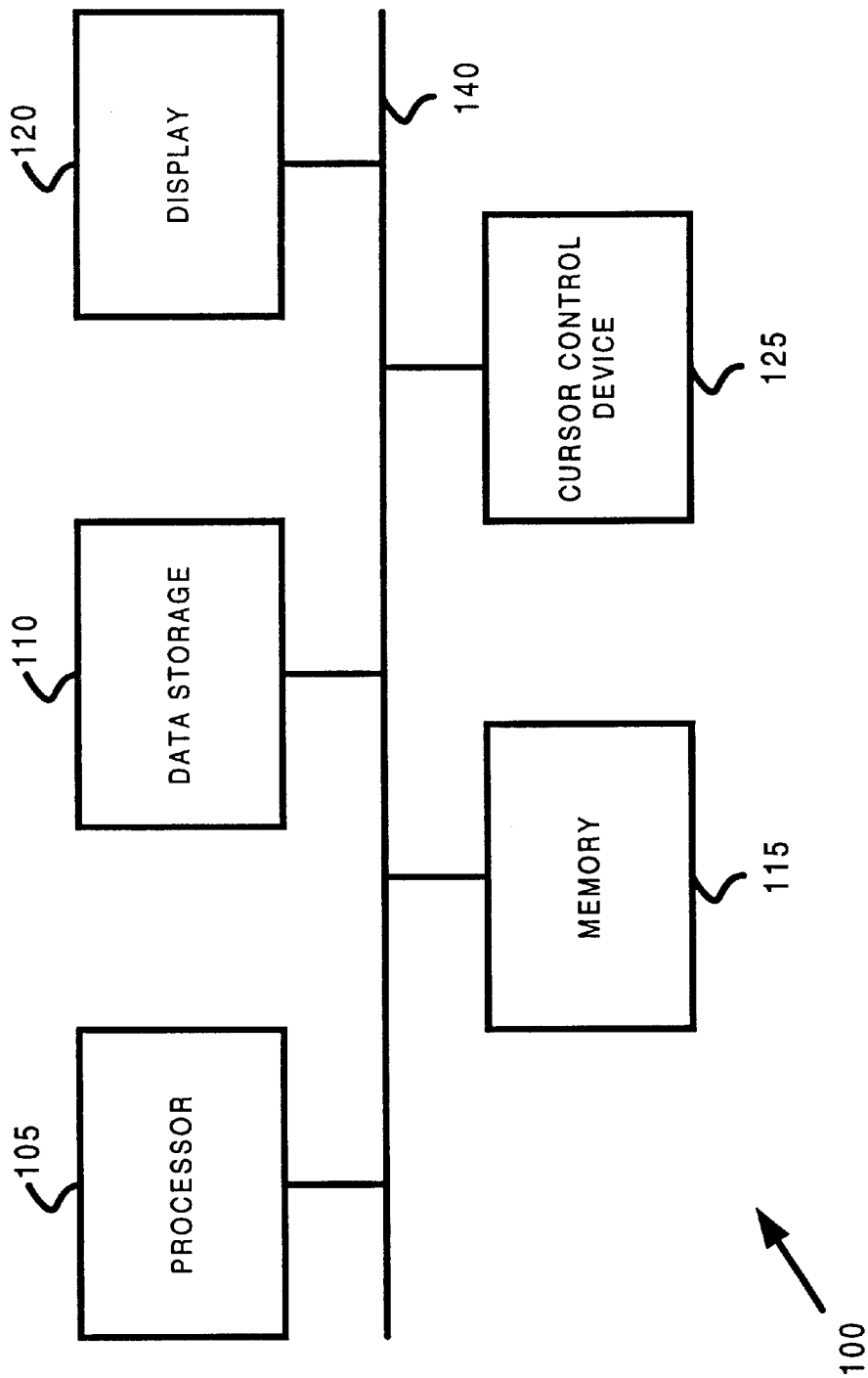
FIG. 1 is a block diagram illustrating a hardware environment capable of running software according to an embodiment of the invention.

FIG. 1 is a block diagram illustrating an exemplary hardware environment in which embodiments of the invention may be practiced. In one embodiment of the invention, computer system 100 comprises processor 105, memory 115, data storage 110, display 120, and cursor control device 125, all operatively coupled via bus 140. The bus 140 can include a single bus or a combination of multiples buses, and is used for communicating information between the various components within the hardware environment.

Processor 105 is capable of decoding and executing a computer program such as an application program or operating system.

Memory 115 is conventional computer memory, including dynamic random access memory (DRAM), static random access memory (SRAM), flash type memory, or other alternative memory types. In addition, memory 115 may include cache memory.

Computer programs and other computer executable modules are loaded into memory 115 for execution by processor 105 from any of a number of different data storage devices 110. It should be appreciated by those skilled in the art that any type of computer-readable media which can store data that is accessible by a computer, such as magnetic cassettes, magnetic disks, optical disks, flash memory cards, digital video disks, Bernoulli cartridges, random access memories (RAMs), read only memories (ROMs), and the like, may be used as a data storage device 110 in the exemplary hardware environment.

Output from computer programs running in the hardware environment are sent to display device 120. The display device 120 may be a liquid crystal device, cathode ray tube, or other display device suitable for creating graphic images and/or alphanumeric characters recognizable to the user.

Cursor control device 125 communicates user input information and command selections to the processor 105 based on a user's hand movement. The cursor control device 105 allows the user to dynamically signal the two-dimensional movement of a visible symbol or pointer on a display screen of the display device 120. Many implementations of the cursor control device are known in the art, including a track ball, mouse, joystick, all capable of signaling movement in a given direction or manner of displacement. Each of the implementations are sometimes generically referred to as a mouse.

Those skilled in the art will recognize that a hardware environment may include other components, such as keyboards and network interfaces, and that only those components necessary to provide an enabling description of the invention are described here.

In addition, it will be appreciated by those skilled in the art that some of the components may be operatively coupled to the hardware environment via a network through a network interface operatively coupled to bus 140. For example, data storage devices, display devices and cursor control devices may all be connected to a network that is remote from the other components of the hardware environment.

Figure 2:
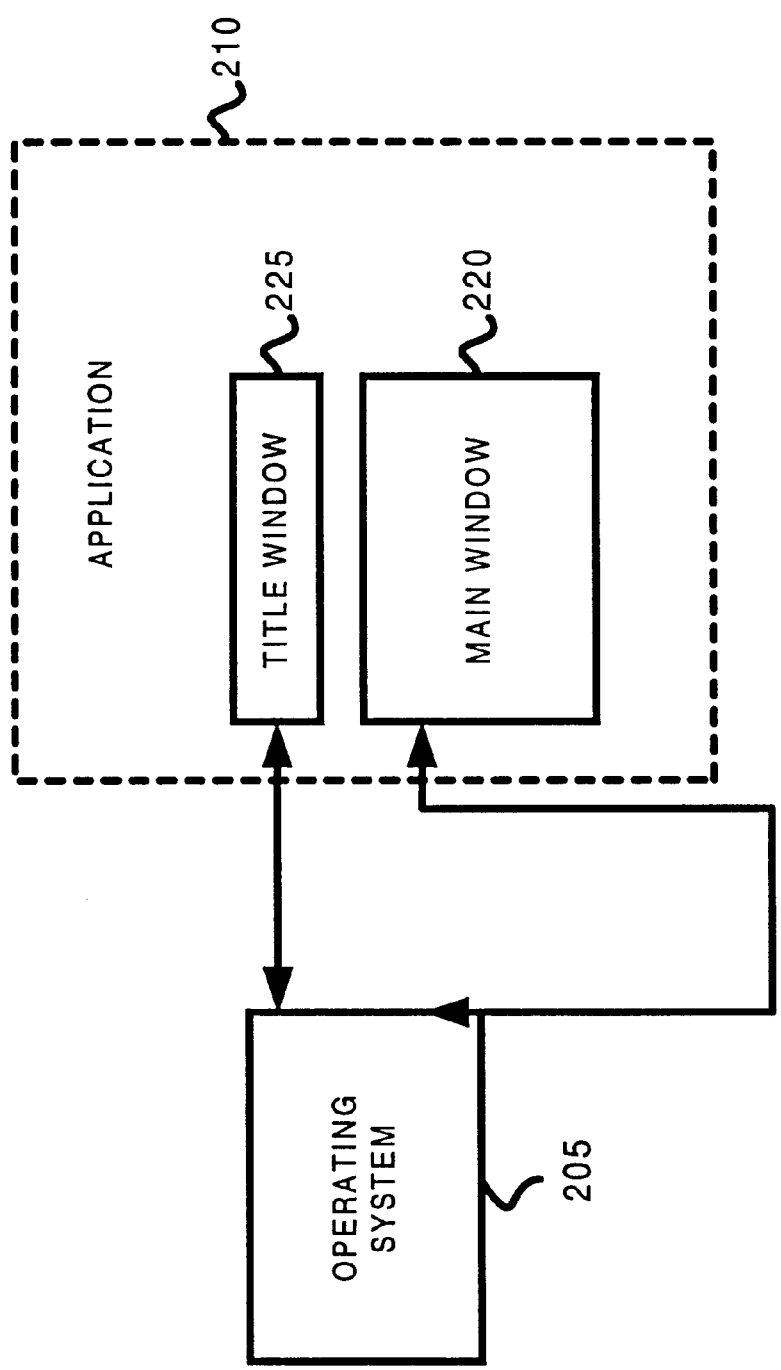
FIG. 2 is a block diagram illustrating a software environment in which embodiments of the invention may be practiced.

In FIG. 2, a block diagram of the major components of a software environment 200 is shown. The software environment 200 includes an operating system 205, an application 210, a main window 220, and a second window 225.

Operating system 205 is a computer program that manages the execution of various computer programs running within the software environment, such as application 205. In addition operating system 205 controls and manages the various components of the hardware environment 100 described above. In one embodiment of the invention, operating system 205 is a version of the Microsoft Windows operating system from Microsoft Corporation, such as the Windows 95, Windows 98, and Windows NT operating systems. In alternative embodiments of the invention, the operating system comprises Apple's MacOS and Rhapsody, and Sun Microsystem's Solaris operating system.

Application 210 is a computer program running under the control of operating system 205. Application 210 is a computer program generally intended to be run by an end-user of a computer system. These programs include word processors, database applications, spreadsheets and the like. In one embodiment of the invention, output from application 210 is displayed in main window 220. In an embodiment of the invention, main window 220 is a non-rectangular window.

In addition application 210 controls a second window 225, which, in one embodiment, is a title bar window for main window 220. In an embodiment of the invention, the second window is created by main window 220 when the main window is created by the application 210.

While application 210 is running, operating system 205 generates messages that are sent to application 210. The messages include input from devices such as keyboards and cursor control devices (including device positioning and button events), window movement and resizing commands, and notifications that a window controlled by the application currently has focus, or has lost focus.

These messages are received by the application by what will be referred to as a windows message handler for the particular window 220 or 225. The windows message handler can be a function, macro, template, or other component of the application designed to process windowing related messages received from the operating system. The windows message handler uses the methods described below in reference to FIGS. 3–7 to process the message.

FIGS. 3–7 are flowcharts describing computerized methods of various embodiments of the invention. The computerized methods are desirably realized at least in part as one or more programs running on a computer—that is, as a program executed from a computer-readable medium such as a memory by a processor of a computer. The programs are desirably storable on a computer-readable medium such as a floppy disk, CD-ROM, or Compact Flash (CF) card for distribution, installation and execution on another (suitably equipped) computer. The programs may also be stored on one computer system and transferred to another computer system via a network connecting the two systems, thus at least temporarily existing on a carrier wave or some other form of transmission.

Figure 3:
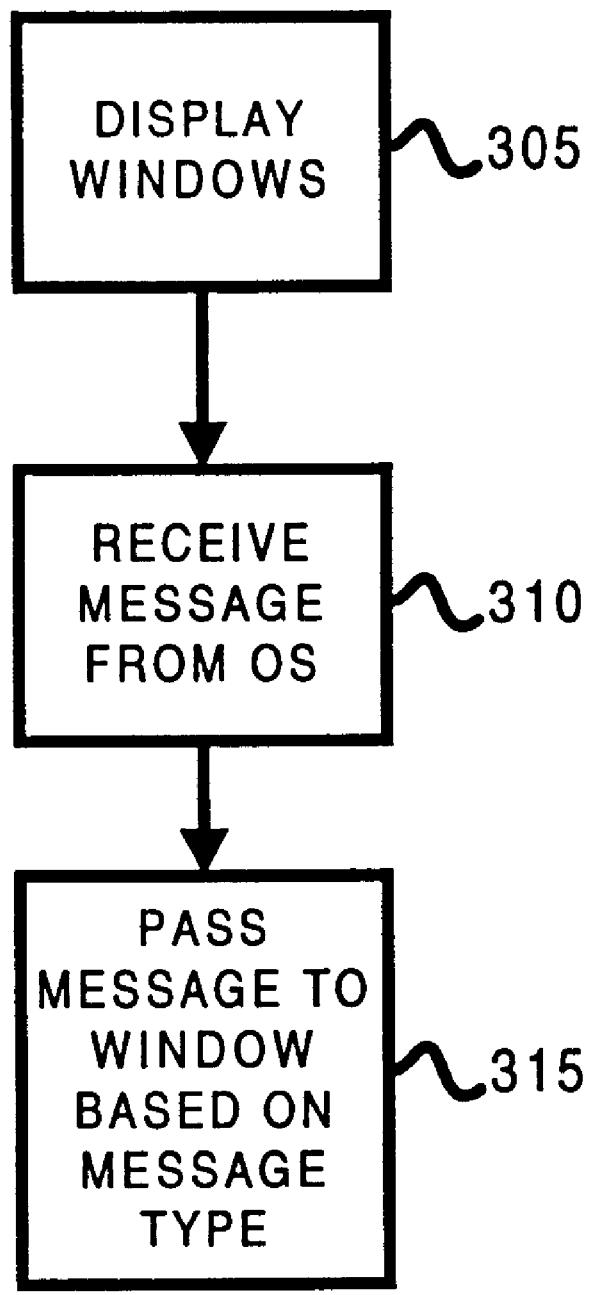
FIG. 3 is a flowchart describing a method for processing a plurality of windows according to an embodiment of the invention.

FIG. 3 provides a flowchart illustrating the general flow of a method according to one embodiment of the invention, with FIGS. 4–7 providing details regarding specific message types processed by the method. In general, the methods of the invention insure that two related windows are updated correctly. That is, the methods insure that the two related windows move together, are activated together, and that the appropriate window processes the system menu display.

Referring now to FIG. 3, the method begins when an application creates and displays a windows to present output to a user (block 305). In one embodiment of the invention, at least two windows are created, a main window to receive the application's output and a second window that is associated with the main window. In an embodiment of the invention, the main window is a non-rectangular window and the second window is a title bar window for the non-rectangular window.

After the application has created the windows, the operating system will generate and send messages to the windows (block 310). Messages generated by the operating system include messages that control the size and placement of the windows, messages that indicate mouse activity in the windows (including both device buttons and cursor positioning activity), messages that indicate system menus have been invoked, and messages indicating that the window should be repainted due to tiling or the movement of an overlapping window from on top of a section of the application's window.

In one embodiment of the invention, after a window of the application has received a message, it determines, based on the type of message, whether to process the message itself, route the message to the associated window, or do both (block 315). In an embodiment of the invention, the message may be routed to a main window, a title bar window associated with the main window, or both windows.

Figure 4:
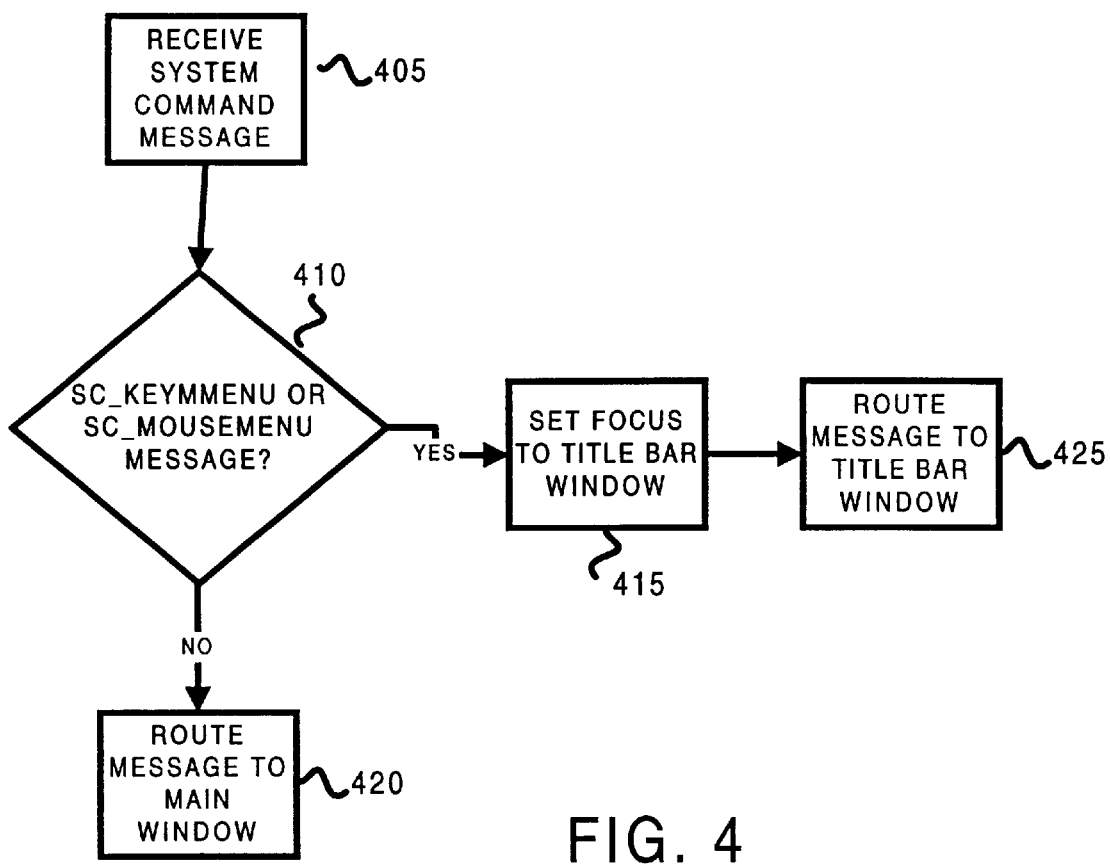
FIGS. 4–7 are flowcharts providing further details for processing messages performed by the method shown in FIG. 3.

FIG. 4 is a flowchart presenting further details on the message processing method described above. In particular, FIG. 4 presents details the processing of system command messages. The method begins when a system command message is received (block 405). The method then checks to see if the system command in the message should be handled by a title bar window or a main window. In one embodiment of the invention, the method checks for an SC_KEYMENU command or an SC_MOUSEMENU command indicating that the system menu should be displayed (block 410). If so, the method routes the message to the title bar window by calling code that processes the title bar window (block 425). The title bar window then processes the message in the default manner. That is, the title bar window displays the system menu.

If the check at block 410 determines that the command is not one that should be processed by the title bar window, the method routes the message to the main window (block 420). In one embodiment of the invention, the title bar window is given focus before the message is passed (block 415).

Figure 5:
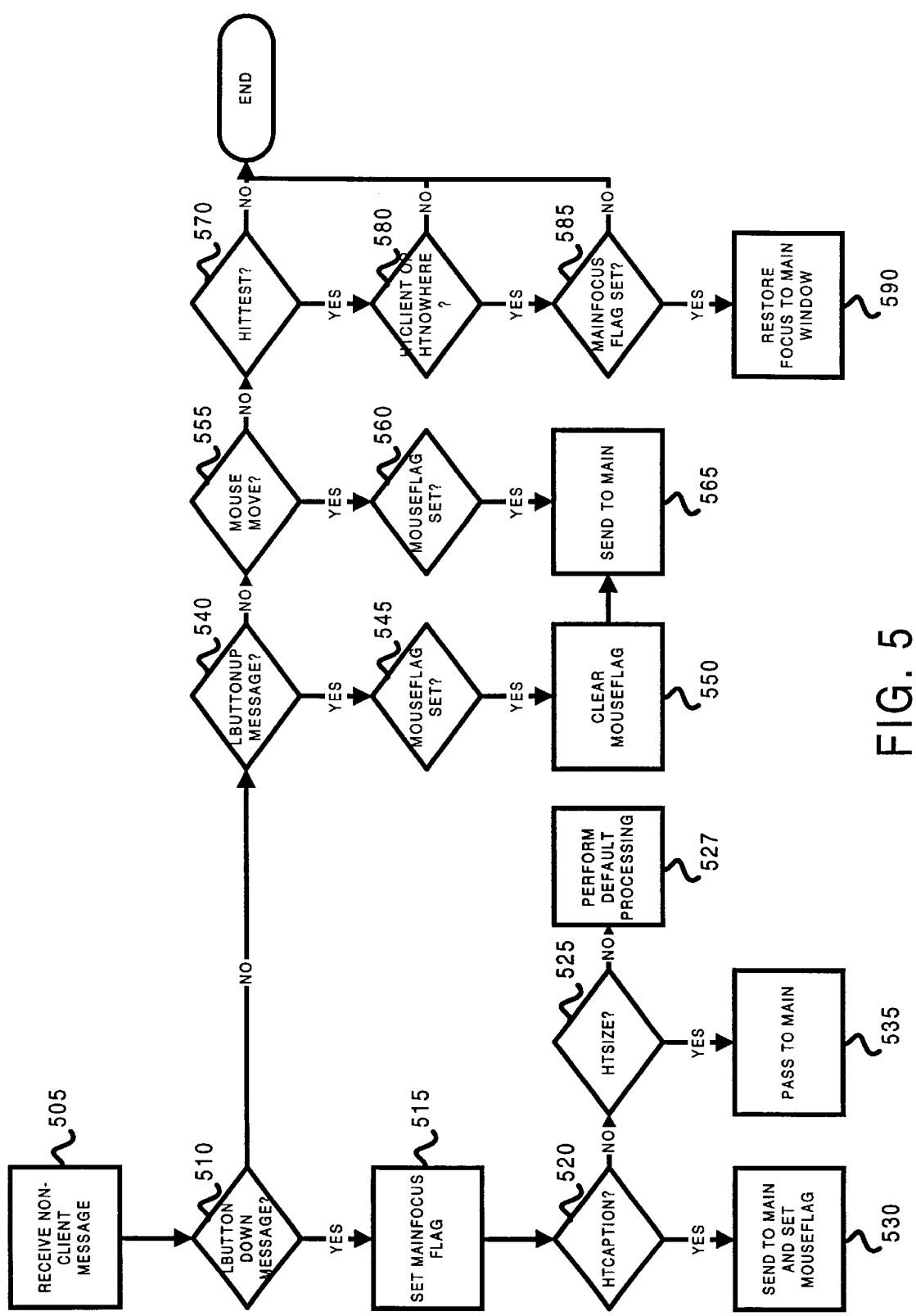

In FIG. 5, a flowchart presenting further details on the processing of non-client message by a method according to one embodiment of the invention. Non-client messages, as is known in the art, are messages the are generated when a cursor is positioned outside of the client area of a window. These areas include scroll bar areas and title bar areas of the window.

The method begins at block 505 when the an associated window, such as a title bar window, receives a non-client message (non-client messages received by the main window are processed in the default manner for the particular windowing system). The method checks for a variety of non-client messages, including lbutton (left mouse button) down (block 510), lbutton up (block 540), mouse movement (block 555) and hit test (block 570).

If the check at block 510 indicates that an lbutton down message has been received, the method then sets a flag (MainFocus) indicating that focus should be set to the main window of the application. In addition, the method checks to see if the cursor was in the title bar when the left mouse button was pressed. In one embodiment of the invention, this is indicated when the message has the HTCAPTION flag set (block 520). If so, the method then sets a flag (MouseFlag) indicating that future cursor control device messages received for the title bar should also be sent to the main window. In addition, the message is then passed to the main window for processing (block 530).

If the message has any of a plurality of HTSIZE flags set, indicating that the left mouse button was pressed while the cursor was in a sizing area of the window (block 525), the message is passed to the main window for processing (block 535). If the main window does not allow sizing, the message is processed in the default manner for the particular windowing system (block 527).

If the message received is an lbutton up (left button up) message (block 540), the method then checks to see if the MouseFlag is set, indicating that cursor control device events received by the title bar are currently being forwarded to the main window (block 545). If so, the MouseFlag is cleared (block 550), and the lbutton up message is sent to the main window (block 565).

The method also checks to see if the message received at block 505 is a mouse move message (block 555). If so, the method then checks the MouseFlag to determine if mouse events are currently being forwarded to the main window (block 560). This will typically be the case if the mouse movement occurs after the left mouse button has been depressed. If the MouseFlag is set, the mouse movement message forwarded to the main window for processing (block 565). Further details on the movement of the main and title bar window are provided below with reference to FIG. 7.

The method also checks to determine if the non-client message received in the title bar window is a hit test message (block 570). A hit test message, as is known in the art, is a message used to determine if the cursor is positioned over a particular object. In other words, the message determines if the cursor has "hit" an object in the window. If the message is a hit test message, the method, in one embodiment, then checks to see if the HTCLIENT for HTNOWHERE flags are set in the message (block 580). If so, the method also checks the MainFocus flag to determine if the main window should receive focus (block 585). If the flag is set, the method causes focus to be restored to the main window (590).

Figure 6:
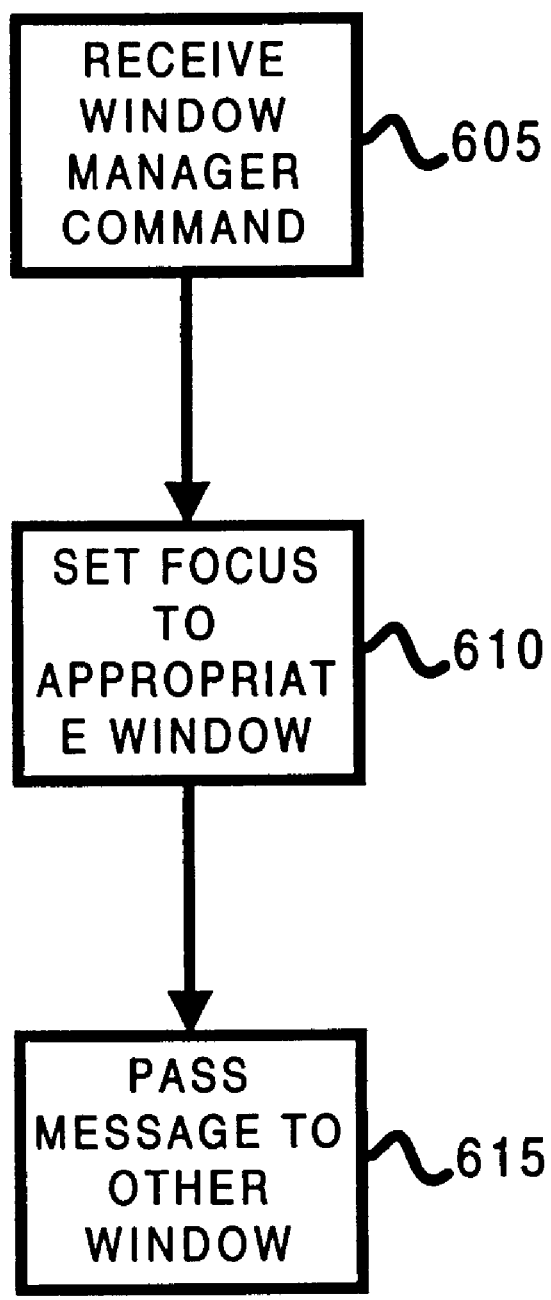

In FIG. 6, a flowchart is shown that presents further details on the processing of window manager commands. Examples of window manager commands include commands that result when a user picks a menu item from a system menu on a title bar window associated with a main window. The method begins when the title bar window receives a message containing a window bar command (block 605). The title bar window causes focus to be set to the appropriate window, that is, the main window associated with the title bar window (block 610). The method then passes the command containing the window manager command to the main window (block 615).

In one embodiment of the invention (not shown), a window manager activation command such as a WM_ACTIVATE(FALSE) message is sent to the main window of an application to deactivate the main window. Included in the message is a handle to the next window to be activated is included as part of the message. Upon receipt of the message, the main window checks to see if the next window to be activated is the title bar window associated with the main window. If the title bar is not the next window to be activated, the main window sends a WM_NCACTIVATE(FALSE) message to the title bar. It is desirable to perform such a check in order to avoid inadvertently deactivating the title bar when it is the next window to be activated.

Figure 7:
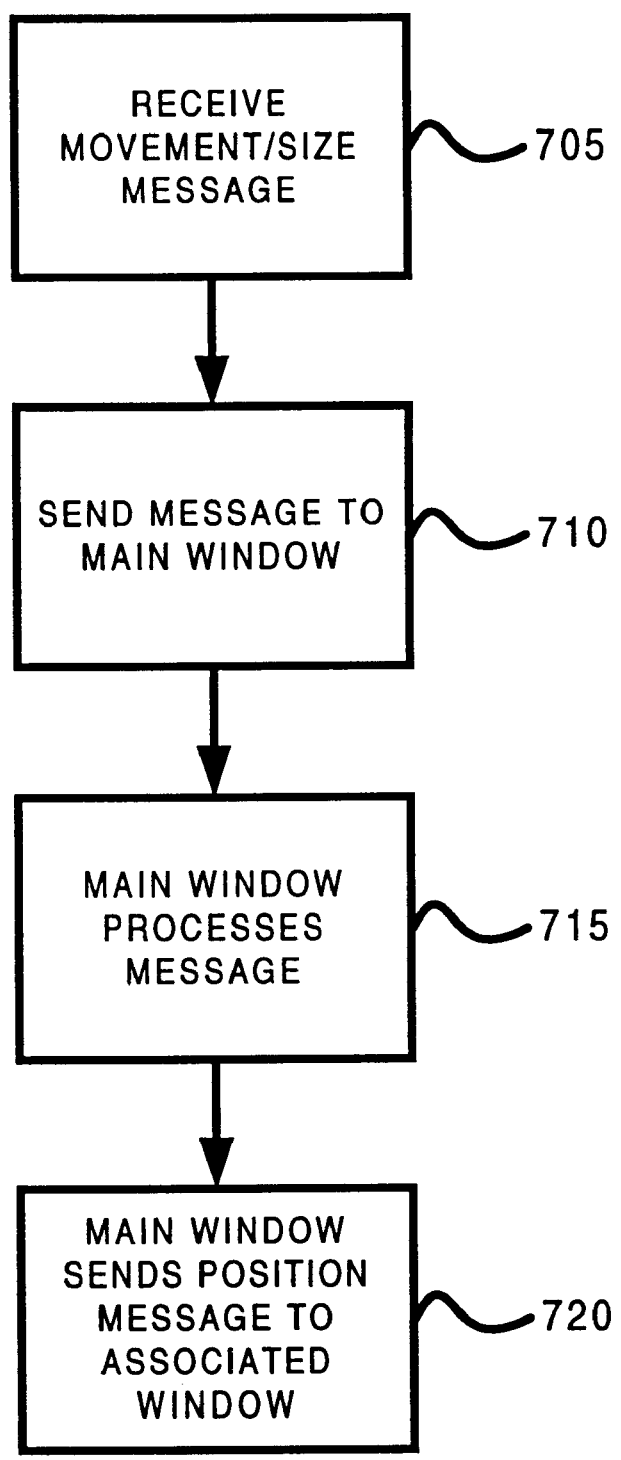

In FIG. 7, a flowchart presenting further details on processing window movement and size messages is shown. The method begins when a movement or size message is sent to a window associated with a main window, such as a title bar window (block 705). The title bar window does not immediately process the message, rather it sends it to the main window (block 710). The main window processes the message, and which either causes a movement or size adjustment of the main window (block 715). The main window then sends a message containing movement parameters back to the associated window (block 720). It is desirable to allow the main window to process movement and size messages prior to the associated window, because it allows the main window to position and center the associated window appropriately in the case where the size of the main window is adjusted, requiring a proportional, rather than direct, adjustment in the position of the associated window. This is particularly true when the associated window is a title bar window.

In one embodiment of the invention, positioning of the associated or title bar window is always accomplished by the main window, and there is no mechanism for a user to directly reposition the title bar window. In other words, the title bar window always ignores positioning messages received from the operating system. It passes these messages to the main window, and responds only to positioning messages received form the main window.

In addition to the non-client messages detailed above, the method processes other types of messages received by the title bar window. One example of such a message indicates that the appearance for all title bar windows has been changed. In one embodiment of the invention, this message is the WM_SYSCOLORCHANGE message. In this case, the title bar window must be repainted to reflect the new system defined appearance. In one embodiment of the invention, the repainting is accomplished by issuing function calls to hide the window, to show the window, followed by a repaint of the window.

Also, in an embodiment of the invention, the title bar responds to WM_MINMAX messages to allow sizes larger than that defined by versions of the Microsoft Windows operating system. In one embodiment of the invention, the title bar window receives the WM_MINMAX message from the main window. In general, the main window will only send such a message if the main window is performing an activity such as stretching the window in a horizontal or vertical direction.

In addition, size change messages that occur as a result of horizontal or vertical tiling of the windows must be processed. In one embodiment of the invention, an WM_SIZE messages causes the title bar window to reposition in the case where the windows are tiled by the user. The WM_SIZE message contains a non-zero client area height or width when tiling occurs. In this case, it is desirable for the title bar window to make a direct call to its owner window (in this case, the main window) asking the main window to position the title bar window. This processing is desirable because the operating system treats the two windows as independent windows during a tiling operation, when in fact, the title bar window must tiled to the proper position in relation to the main window.

The method shown in FIG. 3 also insures that activation messages received by the main window are coordinated and passed to the title bar window. For example, in one embodiment of the invention, the title bar window is activated by sending title bar window a WM_NCACTIVATE(TRUE) when the main window is activated and a WM_NCACTIVATE(FALSE) when the main window is deactivated.

In addition to activation messages, the method, in one embodiment of the invention, also causes other messages received by the main window to be passed on to the title bar. These messages include movement, enablement, and dialog messages. Window movement messages received by the main window (WM_MOVE messages in one embodiment) are passed to the title bar for processing.

In general, messages received by a window are either processed by the receiving window or ignored and passed on to the associated window. One exception to this is the WM_ENABLE message. When a WM_ENABLE message is received, the receiving window processes the message, and passes it to the associated window, which also processes it. For example, window enable and disable messages received by the main window are processed and then passed to the title bar window by sending WM_ENABLE message to the title bar.

Finally, in one embodiment of the invention, it is desirable for the main window to call the title bar window's IsDialogMessage function to allow keyboard access to the title bar window's menu. This is typically accomplished in a PreTranslateMsg function.

From the foregoing detailed description, those skilled in the art will appreciate that embodiments of the invention provide advantages not found in previous systems. For example, the systems and methods described above allow a non-rectangular window to have a title bar and associated menu that are not left-justified. The title bar can be positioned anywhere the user finds desirable, thereby allowing for much greater flexibility over previous systems. In addition, because the associated title bar window is created and managed as part of the windowing system, any changes to the windowing system in later versions will be automatically reflected in the title bar window, thereby avoiding costs associated with maintaining custom title bar painting code.

Some portions of the detailed description have been presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like. It should be borne in mind, however, that all of these and similar terms are to be associated with the appropriate physical quantities and are merely convenient labels applied to these quantities. Unless specifically stated otherwise as apparent from the following discussions, it is appreciated that throughout the present invention, discussions utilizing terms such as "processing" or "computing" or "calculating" or "determining" or "displaying" or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

Although specific embodiments have been illustrated and described herein, it will be appreciated by those of ordinary skill in the art that any arrangement which is calculated to achieve the same purpose may be substituted for the specific embodiments shown. For example, while the invention has been described in reference to a main window and a title bar window, the systems and methods disclosed can be adapted to any case where two windows are to act together as one window. This application is intended to cover any adaptations or variations of the present invention. Therefore, it is manifestly intended that this invention be limited only by the following claims and equivalents thereof

What is claimed is:

1. A method comprising:

displaying a plurality of windows associated with an application, including a non-rectangular window and a second window, the second window further having an association with the non-rectangular window, wherein a position and size of the second window is determined relative to a position and size of the non-rectangular window;

receiving a message having a message type from an operating system;

determining according to the message type whether the non-rectangular window or the second window is to receive the message; and passing the message to the determined window.

2. The method of claim 1, wherein the second window comprises a title bar window.

3. The method of claim 2, wherein the message type comprises a system command.

4. The method of claim 4, wherein if the system command comprises a SC_KEYMENU command or a SC_MOUSEMENU command, passing the message further comprises passing the message to the title bar window, otherwise passing the message further comprises passing the message to the non-rectangular window.

5. The method of claim 2, wherein the message type comprises an activation message type received by the non-rectangular window and wherein the message is sent to the title bar window.

6. The method of claim 1, wherein the message type comprises a non-client message.

7. The method of claim 6, wherein the message indicates a mouse button has been depressed, and wherein passing the message to at least one window sets a mouse flag and passes the message to the non-rectangular window.

8. The method of claim 6, wherein the message indicates that a mouse has moved and wherein passing the message passes the message to the non-rectangular window if a mouse flag has been set.

9. A computerized system comprising:

an operating system;

an application operating within the operating system, said application displaying a plurality of windows including a non-rectangular window and a second window, the second window having an association with the non-rectangular window, each of said windows having a position and size; and a windows processing component of the application, operative to receive a message having a message type generated by the operating system and further operative to pass the message to the non-rectangular window or second window in accordance to the message type, wherein the position and size of the second window is determined relative to the position and size of the non-rectangular window.

10. The system of claim 9, wherein the second window comprises a title bar window.

11. The system of claim 10, wherein the message type comprises a system command.

12. The system of claim 11, wherein if the system command comprises a SC_KEYMENU command or a SC_MOUSEMENU command, passing the message passes the message to the title bar window, otherwise passing the message passes the message to the non-rectangular window.

13. The system of claim 10, wherein the message type comprises a non-client message.

14. The system of claim 13, wherein the message indicates a mouse button has been depressed, and wherein passing the message to at least one window sets a mouse flag and passes the message to the non-rectangular window.

15. The system of claim 13, wherein the message indicates that a mouse has moved and wherein passing the message passes the message to the non-rectangular window if a mouse flag has been set.

16. The system of claim 10, wherein the message type comprises an activation message type received by the non-rectangular window and wherein the message is sent to the title bar window.

17. A computer-readable medium having computer-executable instructions for performing a method comprising:

displaying a plurality of windows, including a non-rectangular window and a second window, the second window having an association with the non-rectangular window, wherein a position and size of the second window is determined relative to a position and size of the non-rectangular window;

receiving a message having a message type from an operating system;

determining according to the message type whether the non-rectangular window or the second window is to receive the message; and passing the message to the determined window.

18. The computer-readable medium of claim 17, wherein the second window comprises a title bar window.

19. The computer-readable medium of claim 18, wherein the message type comprises a system command.

20. The computer-readable medium of claim 19, wherein if the system command comprises a SC_KEYMENU command or a SC_MOUSEMENU command, passing the message passes the message to the title bar window, otherwise passing the message passes the message to the non-rectangular window.

21. The computer-readable medium of claim 18, wherein the message type comprises a non-client message.

22. The computer-readable medium of claim 21, wherein the message indicates a mouse button has been depressed, and wherein passing the message to at least one window sets a mouse flag and passes the message to the non-rectangular window.

23. The computer-readable medium of claim 21, wherein the message indicates that a mouse has moved and wherein passing the message passes the message to the non-rectangular window if a mouse flag has been set.

24. The computer-readable medium of claim 18, wherein the message type comprises an activation message type received by the non-rectangular window and wherein the message is sent to the title bar window.

* * * * *